(12) United States Patent
Bergery et al.

(10) Patent No.: US 7,908,086 B2
(45) Date of Patent: Mar. 15, 2011

(54) SYSTEM AND METHOD FOR FILTERING SEISMIC NOISE DATA TO ANALYZE SEISMIC EVENTS

(75) Inventors: Guillaume Bergery, Puyricard (FR); Vincente H. Guis, Marseilles (FR)

(73) Assignee: Magnitude SPAS (FR)

( * ) Notice: Subject to any disclaimer, the term of this patent is extended or adjusted under 35 U.S.C. 154(b) by 464 days.

(21) Appl. No.: 11/962,191

(22) Filed: Dec. 21, 2007

(65) Prior Publication Data
US 2008/0162052 A1    Jul. 3, 2008

Related U.S. Application Data

(60) Provisional application No. 60/882,668, filed on Dec. 29, 2006.

(51) Int. Cl.
*G01V 1/00* (2006.01)
(52) U.S. Cl. .......................................... 702/14
(58) Field of Classification Search ............... 702/14–18
See application file for complete search history.

(56) References Cited

U.S. PATENT DOCUMENTS

| 6,405,136 B1 * | 6/2002 | Li et al. ............................ 702/10 |
| 2006/0085155 A1 * | 4/2006 | Miguelanez et al. ......... 702/118 |

OTHER PUBLICATIONS

James Albright, et al. "Seismic Surveillance for Monitoring Reservoir Changes". Oilfield Review. vol. 6. No. 1, Jan. 1994. pp. 4-14.
Stuart Jardine, et al. "Putting a damper on Drilling's Bad Vibrations". Oilfield Review. vol. 6. No. 1, Jan. 1995. pp. 15-20.
Les Bennett, et al. "The Source for Hydraulic Fracture Characterization". Oilfield Review. Dec. 1, 2005. pp. 42-57.
Andrey Bakulin, et al. "Downhole acoustic surveillance of deepwater wells" [Abstract Only] The Leading Edge. Apr. 2008. pp. 518-531.
Hirokazu Moriy, et al. "Multiplet-clustering Analysis Reveals Structural Details within Seismic Cloud at the Soultz Geothermal Field, France". Bul. Seism. Soc. Am., Aug. 2003, pp. 1-31.
Torsten Clemens, "Reservoir Performance and Monitoring". Technology Focus. JPT. Sep. 2006. pp. 84-99.
Yves Serge Simon. "Stress and fracture characterization in a shale reservoir, North Texas, using correlation between new seismic attributes and well data". A Thesis Presented to the Faculty of the Department of Geosciences, University of Houston. pp. 1-20. Dec. 2005.
Stephen Wilson, et al. "Passive seismic makes sense for 4D reservoir monitoring" [Abstract Only], Firstbreak vol. 23, Oct. 2004. pp. 59-65.
Erick Baziw, et al. "A Rao-Blackwellised type algorithm for passive seismic event detection", Dec. 14-15, 2004, pp. 135-164.
Microseismic hydraulic fracture monitoring. Geospace Technologies. www.geospacetech.com. Mar. 2004, 2 pages.

* cited by examiner

*Primary Examiner* — Drew A Dunn
*Assistant Examiner* — Stephen J Cherry
(74) *Attorney, Agent, or Firm* — Cantor Colburn LLP

(57) ABSTRACT

A method for filtering noise from seismic data is disclosed. The method includes: receiving at least one seismic data set; computing a value of at least one subset of a plurality of subsets of the at least one seismic data set; computing quartiles and an upper moustache (M) for the plurality of subsets; comparing the upper moustache (M) to the value of the at least one subset; and one of discarding and retaining the at least one subset as filtered seismic data. A system and computer program product for filtering noise from seismic data is also disclosed.

20 Claims, 4 Drawing Sheets

SYSTEM AND METHOD FOR FILTERING SEISMIC NOISE DATA TO ANALYZE SEISMIC EVENTS

CROSS REFERENCE TO RELATED APPLICATIONS

Under 35 U.S.C. §119(e), this application claims the benefit of U.S. Provisional Application No. 60/882,668, filed Dec. 29, 2006, the entire disclosure of which is incorporated herein by reference.

BACKGROUND OF THE INVENTION

1. Field of the Invention

The teachings herein relate to seismic monitoring, and in particular, to limiting noise effects in seismic data.

2. Description of the Related Art

Subterranean formations may be monitored using one or more seismic receivers. The receivers may be geophones placed at the surface or submerged in wells or on the ocean floor. Also, the receivers may be hydrophones placed in those same locations, but sensitive to only certain types of waves. The receivers placed in wells may be shallow (usually above the formation of interest) or deep (usually at or below the formation of interest). Seismic receivers may be sensitive to seismic waves along a certain axis or those traveling on any axis. Likewise, the receivers may be sensitive to only certain types of seismic waves, or several types. Those sensitive to certain axis of travel, called directional receivers, may be coupled with other directional receivers. For example, a directional receiver may be coupled with two other directional receivers in a set of three orthogonal receivers which collect information about the waves in three dimensions. This three-dimensional information may be rotated mathematically through the use of trigonometric functions in order to derive information as to wave travel in the x-axis, y-axis, and z-axis relative to gravity. Alternatively, mathematical rotation may provide translation of the data relative to a wellbore, a cardinal direction, or any other reference point.

Microseismic monitoring concerns passively monitoring a formation for seismic events which are very small. Such events may include the seismic effects generated in a formation by fracturing, depletion, flooding, treatment, fault movement, collapse, water breakthrough, compaction or other similar subterranean interventions or effects. One of the main problems with microseismic monitoring, as with other forms of seismic monitoring, is that of noise. With microseismic events, however, the problem is emphasized because the signal strength is generally very small. This means, in turn, that a small amount of noise which would not cause any significant effect as to a regular, active seismic survey causes a significant degradation of the signal to noise ratio in the microseismic survey.

Microseismic surveys include receiving data from a receiver, locating data which exceeds some threshold, and analyzing those over-threshold data in order to determine information about certain events. Data which does not meet the threshold is discarded or simply not recorded as noise data.

Microseismic data may be analyzed as a set, with several receivers providing data for a joint analysis. Data is collected from a receiver and related to other data collected from other receivers in order to derive additional information about the formation. Information from three receivers, for example, may be triangulated in order to estimate the location of a seismic event.

What are needed are a methods and systems to effectively filter or remove noise data from seismic data.

SUMMARY OF THE INVENTION

Disclosed is a method for filtering noise from seismic data. The method includes: receiving at least one seismic data set; computing a value of at least one subset of a plurality of subsets of the at least one seismic data set; computing quartiles and an upper moustache (M) for the plurality of subsets; comparing the upper moustache (M) to the value of the at least one subset; and one of discarding and retaining the at least one subset as filtered seismic data.

Also disclosed is a system for filtering noise from seismic data. The system includes at least one seismic receiver for outputting seismic data, and a processing unit for inputting the seismic data and implementing instructions for evaluating seismic data by: receiving at least one seismic data set from the at least one seismic receiver; computing a value of at least one subset of a plurality of subsets of the at least one seismic data set; computing quartiles and an upper moustache (M) for the plurality of subsets; comparing the upper moustache (M) to the value of the at least one subset; and one of discarding and retaining the at least one subset as filtered seismic data.

Further disclosed is a computer program product stored on machine readable media for evaluating seismic data by executing machine implemented instructions. The instructions are for: receiving at least one seismic data set; computing a value of at least one subset of a plurality of subsets of the at least one seismic data set; computing quartiles and an upper moustache (M) for the plurality of subsets; comparing the upper moustache (M) to the value of the at least one subset; and one of discarding and retaining the at least one subset as filtered seismic data.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Subterranean formations are of interest for a variety of reasons. Such formations may be used for the production of hydrocarbons, the storage of hydrocarbons or other substances, mining operations or a variety of other uses. One method used to obtain information regarding subterranean formations is to use acoustic or seismic waves to interrogate the formation. Seismic waves may be generated into the formation and the resulting reflected waves received and analyzed in order to provide information about the geology of the formation. Such interrogations are referred to as active seismic surveys. Passive seismic surveys involve placing one or more seismic receivers to receive waves generated in the formation. As described herein, a "formation" may be defined as any subsurface material and/or volume that is targeted for seismic monitoring, or is otherwise subject to evaluation.

Figure 1:
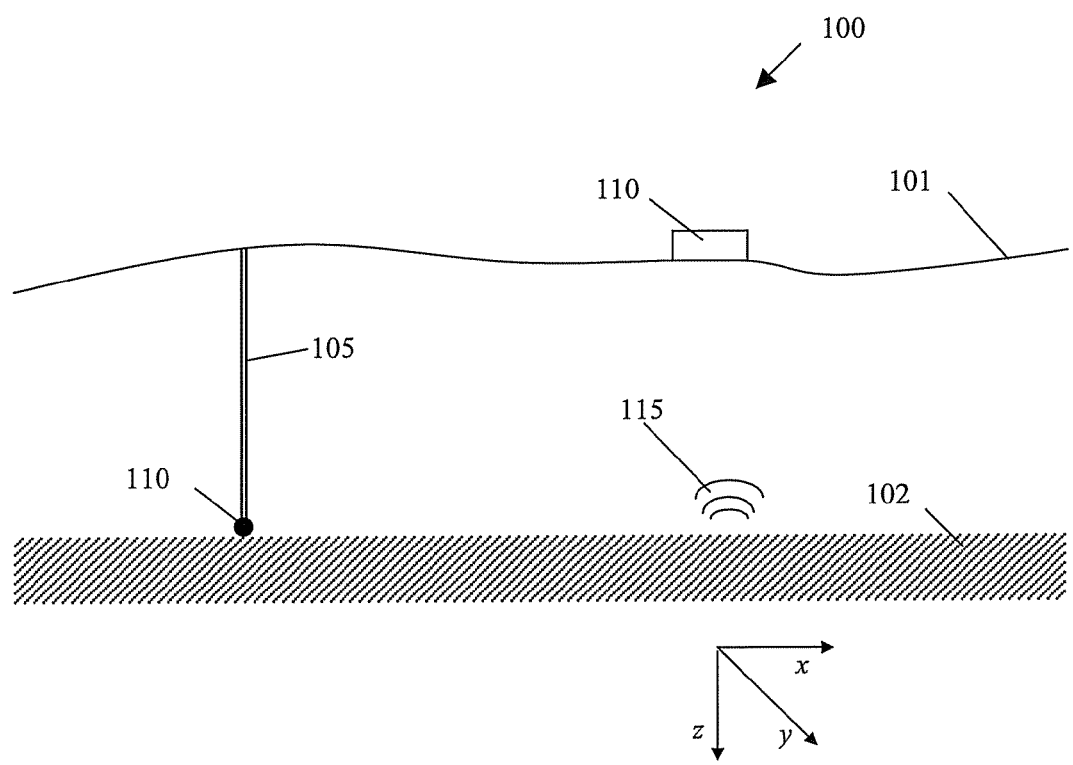
FIG. 1 depicts aspects of a seismic monitoring system.

Referring to FIG. 1, there is provided a system 100 for seismic monitoring. The system 100 includes a plurality of seismic receivers 110. A first receiver 110 is disposed within a wellbore 105, and a second receiver 110 is disposed on a surface 101. Each of the receivers 110 provides for monitoring of seismic activity in or around a formation 102. When seismic activity occurs, seismic waves 115 are generated. Each receiver is adapted to detect seismic signals in the form of, for example, waves 115, and generate seismic data indicative of the waves 115. Thus, the receivers 110 provide indications of seismic activity. Although two receivers 110 are shown, any number of receivers 110, located on the surface 101 or at any location in a geology, may be included in the network 100.

One or more of the receivers 110 may be connected to a computer, processor or other device adapted to receive seismic data (or data from the receiver 110 is provided to a computer) for analysis. The system 100 may further include analysis equipment, memory devices or systems, power sources, timers, support equipment for operation of the receivers 110, or any other components for generating, receiving, storing or analyzing seismic data.

The system 100 may be used in seismic monitoring of a geology. One example of seismic monitoring is microseismic monitoring, which concerns passively monitoring the formation 102 for seismic events which are very small. In passive monitoring, the formation 102 is not interrogated, per se, but the seismic receivers 110 are placed to receive directly any seismic waves 115 generated by events occurring within the formation 102. Such events may include the seismic effects generated in a formation 102 by fracturing, depletion, flooding, treatment, fault movement, collapse, water breakthrough, compaction or other similar subterranean interventions or effects. This additional information about these events may be very useful in order to enhance the use of the formation 102 or provide additional safety measures in certain situations. For example, it is common in the hydrocarbon production industry to fracture or "frac" a formation 102. During this operation, fluid and propant is pumped down a wellbore, such as wellbore 105, at high pressure in order to generate additional fracturing within a zone of the wellbore. The propant is pumped into these fractures and maintains them after the pressure is removed. Monitoring the seismic waves generated during and immediately after a frac operation can provide critical information about the operation, such as the direction and extent of the fractures being generated.

In yet another exemplary application, microseismic monitoring may be used to provide long-term monitoring for subterranean storage facilities and formations 102 from which hydrocarbons or water is being produced. Under certain conditions, the integrity of these formations 102 may become compromised, causing collapse. Such collapses may pose a safety concern for those on the surface 101, as entire sections of ground may fall into the collapse. However, often certain characteristic small seismic waves 115 may precede such failures, permitting remedial measures to delay the collapse and ultimately some warning of the impending collapse to allow for isolation of any dangerous areas from personnel.

One or more subterranean formations 102 may be monitored using one or more of the seismic receivers 110, each of which are adapted for operation to receive seismic waves 115 generated by seismic activity and generate seismic data therefrom. In one embodiment, the receivers 110 are passive seismic receivers. Each receiver 110 may be a geophone and/or a hydrophone placed at the surface 101, submerged in wellbores, such as wellbore 105, or on the ocean floor. Other types of receivers 110 known now or in the future may also be used. The receivers 110 may be placed in shallow wellbores 105 (usually above the formation of interest), deep wellbores 105 (usually at or below the formation of interest) or at the surface 101. The receivers 110 may be sensitive to seismic waves 115 along a certain axis or those traveling on any axis. Likewise, the receivers 110 may be sensitive to only certain types of seismic waves 115, or several types. Those sensitive to certain axes of travel, referred to as directional receivers 110, may be coupled with other directional receivers 110. For example, a directional receiver 110 may be coupled with two other directional receivers 110 in a set of three orthogonal receivers 110 which collect information about the waves 115 in three dimensions. This three-dimensional information may be rotated mathematically through the use of trigonometric functions in order to derive information as to wave travel in the x-axis, y-axis, and z-axis relative to gravity. Alternatively, mathematical rotation may provide translation of the data relative to the wellbore 105, a cardinal direction, or any other reference point.

Each receiver 110 is adapted to detect seismic signals, for example in the form of seismic or acoustic waves 115, and generate a stream of seismic data indicative of the waves 115. Seismic data may include data regarding seismic events and data that is considered noise. Each stream of seismic data includes a plurality of data points generated by a respective receiver 110 during a selected duration of time or time window. The plurality of data points from a single receiver 110 over the selected duration of time or time window is referred to as a "trace". These data points may also be referred to as a "trace data stream". A "data set" for a receiver 110 may refer to a plurality of data points in the trace over any selected time period. Each "data set" or "trace" may be divided into one or more "subsets", which refer to a fraction of the data set over a selected fraction of the time period of the trace. The selected fraction of the time period may be referred to as a "subset time period". Each subset may represent one or more of the plurality of data points. In one embodiment, each of the plurality of data points represents an amplitude of the wave 115 received by the receiver 110 at a certain time in the time window.

The network 100 used to detect the seismic signals may include any number of receivers 110, and can be quite large. In one embodiment, each receiver location may record data from multiple receivers. For example, multiple receivers 110 may be placed in a single location so that data may be recorded from multiple receivers 110. Thus, the terms "receiver" and "receiver location" may analogously denote a location that may generate one or more traces. In another example, receivers 110 that are sensitive to x-axis, y-axis, or z-axis directions may be disposed in a single location to record seismic events or activity. In such an example, three or more traces may be generated from each single location. Each individual receiver or sensor that generates a single trace may also be referred to as a "channel". Monitoring of an entire network, which may consist of tens or hundreds of sensing locations, may generate a large number of traces.

The seismic waves 115 of interest for microseismic monitoring are generally of very small amplitude. Accordingly, a small amount of noise may cause a significant degradation of the signal-to-noise ratio in the microseismic survey. It has been discovered, however, that analyzing several sets of seismic waves 115 which have a very poor signal-to-noise ratio may yield useful information and may lead to the detection of seismic events which were previously undetectable as being below threshold values for detection.

It will be appreciated that, in seismic monitoring such as microseismic monitoring, the signal of interest is frequently the outlier. Therefore, determination of the proper threshold below which data should be discarded and above which data should be kept and analyzed, is critical to proper and efficient operation of the system. If the threshold is set too low, non-significant noise may be recorded for long periods of time. If set too high, significant events may be missed.

Accordingly, a method is provided for determining the optimal threshold for removing noise data from seismic data received from one or more receivers 110 and/or seismic sensors. The method may include analyzing microseismic data to determine the optimal threshold.

The method may include collecting seismic data from at least one receiver 110 over a period of time. In one embodiment, seismic data from a receiver 110 may be plotted on a histogram, a box plot, a box-and-whisker plot, a candlestick plot, a probability density function plot and/or a mathematical diagram. The seismic data may be analyzed using any of these diagrams or otherwise analyzed mathematically.

The method includes performing an analysis on the seismic data to extract a representative value of the background noise. This value may be provided in any number of ways, and may represent, for example, an amplitude, an energy level, or a statistical attribute. Such statistical attributes may include, for example, a summation, an average, a variance, a standard deviation, a range, a t-distribution, a confidence interval, and others. This value may be calculated regularly. For example, a value may be calculated for each subset of a seismic data set or trace. An upper moustache of the data set may then be calculated from these subset values. The upper moustache may then be used as a threshold by which to remove or filter data points and/or subsets.

As referred to herein, a "median" is a value which divides the upper half of the sample from the lower half of the sample, which may be a trace or a data set from one or more channels. A lower quartile ($Q_1$), also known as the first quartile, cuts off the lowest 25% of the data set. An upper quartile ($Q_3$), also known as the third quartile, cuts off the lowest 75% of the data set. An "upper moustache" ("M") may refer to a value that is represented by the following equation:

$$M = Q_3 + 1.5(Q_3 - Q_1)$$

It has been found that the upper moustache (M) is an effective cutoff threshold for seismic data including microseismic data.

Figure 2:
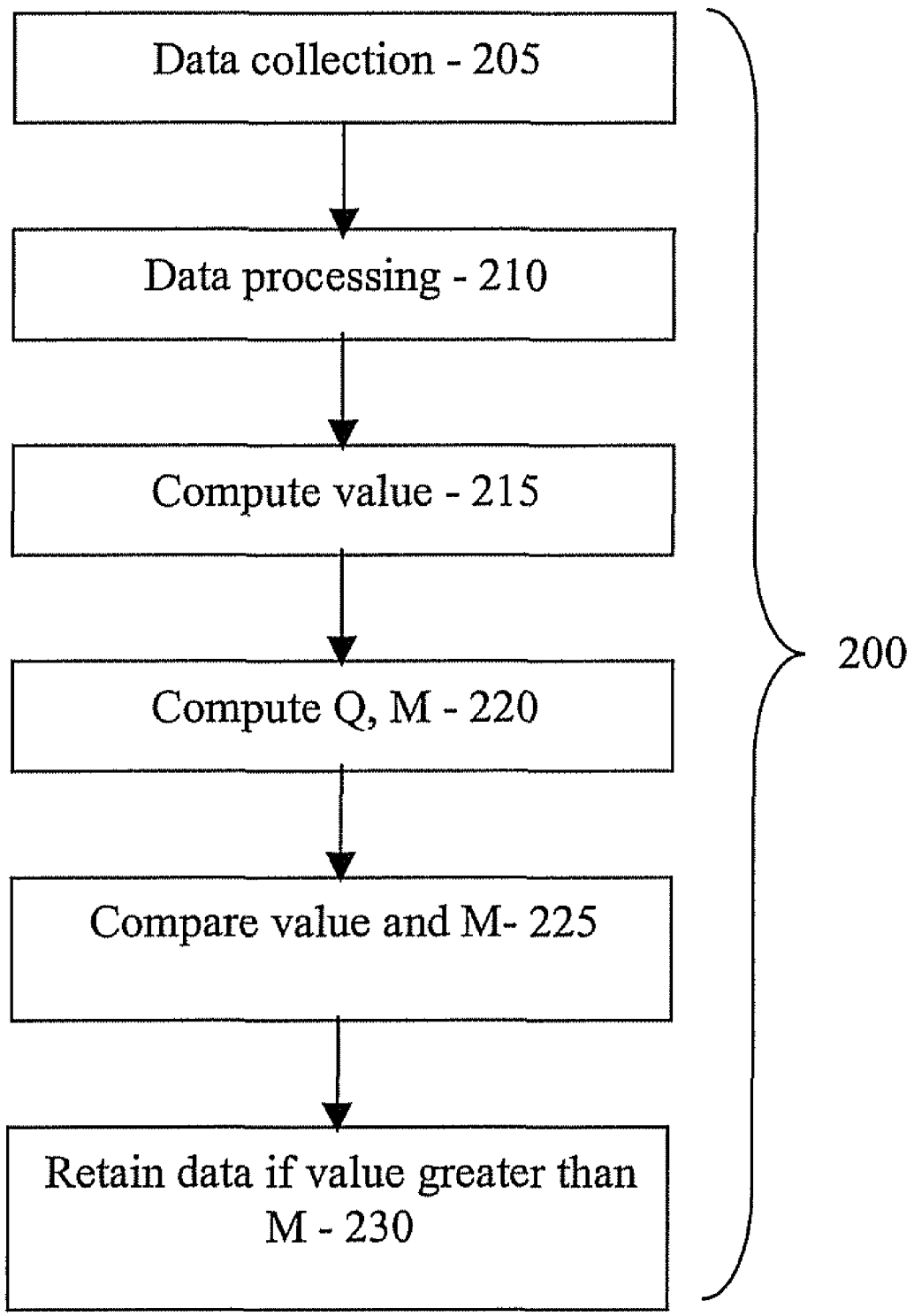
FIG. 2 is a flowchart depicting an exemplary method for filtering noise from seismic data.

FIG. 2 illustrates a method 200 for monitoring seismic events and identifying seismic events by determining an optimum threshold for removing noise data, which may be utilized in, but is not limited to, microseismic passive monitoring. The method 200 includes one or more stages 205, 210, 215, 220, 225 and 230. The method 200 is described herein in conjunction with the plurality of receivers 110, although the method 200 may be performed in conjunction with any number and configuration of receivers. The method 200 may be performed by one or more processors or other devices capable of processing seismic data. In one embodiment, the method includes the execution of all of stages 205, 210, 215, 225 and 230 in the order described. However, certain stages may be omitted, stages may be added, or the order of the stages changed.

In the first stage 205, data collection is performed. At least one data set is collected from at least one receiver 110 (which may include one or more sensors or channels).

In the second stage 210, the collected data set may be processed, for example, to isolate a frequency or frequency bandwidth of interest. This isolation may be accomplished, for example, by processing the data set through a band pass filter.

In the third stage 215, a value is computed for each subset of the data set. The subset value may be computed to represent any selected attribute or characteristic of the subset. Examples of such characteristics include amplitude and energy level, and statistical attributes such as a standard deviation or a range of the data points in a subset. Each subset represents data in a selected time period of the data set.

In the fourth stage 220, the Quartiles ($Q_1$, $Q_3$) are computed for the plurality of subsets, and the upper moustache (M) is computed from the quartiles. The threshold is then computed from the upper moustache (M). In one embodiment, the value represented by the upper moustache (M) is the threshold.

In the fifth stage 225, the upper moustache (M) value is compared to each subset value.

In the sixth stage 230, subsets having a value that is greater than the upper moustache value are retained for further processing, and subsets having values that are less than or equal to the upper moustache value are discarded. Alternatively, subsets having values that are equal to the upper moustache value may be retained. In one embodiment, if one or more consecutive subset values or data point values (referred to herein as $p_x$, $p_{x+1}$) in the data set are found to have a value that is greater than the upper moustache (M) value, the one or more consecutive data subsets are kept for further processing. Otherwise, the data subset is discarded. This comparison may be performed on at least one or all of the subsets in the data set.

In the following example, a procedure for identifying seismic events and filtering noise from seismic data is illustrated with reference to FIGS. 3 and 4. In this example, a data set or trace from a single channel is analyzed according to the method 200 to determine a threshold for removing seismic data.

Figure 3:
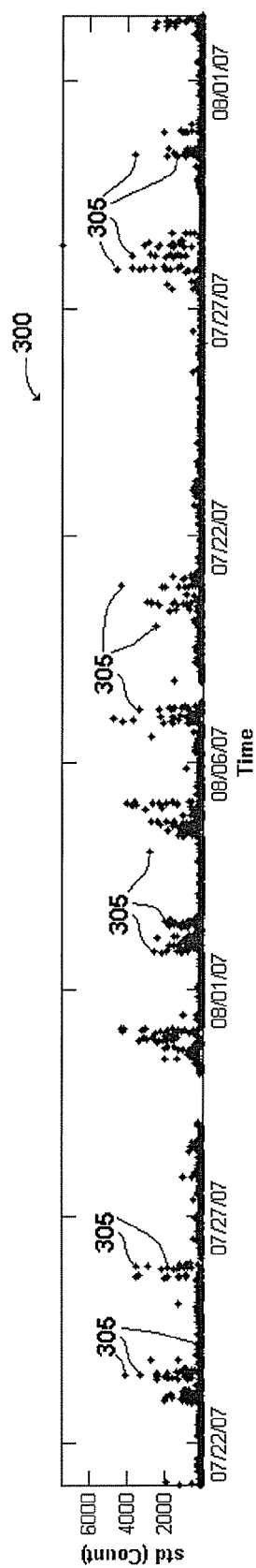
FIG. 3 depicts a diagram showing standard deviation values of subsets of a seismic data set.

Referring to FIG. 3, a data set is collected from a channel over a selected time period. In this example, a channel is an axis of a sensor. The data set is divided into a plurality of subsets, each representing seismic data over a selected subset time period, e.g., 15 seconds. A standard deviation value is calculated for each subset and plotted on a diagram 300. Each point 305 in the diagram 300 represents the value of the standard deviation for each subset, and is labeled as "std (count)". Thus, the diagram 300 shows the standard deviation value for each 15 second subset over the entire time period of the channel data set.

Figure 4:
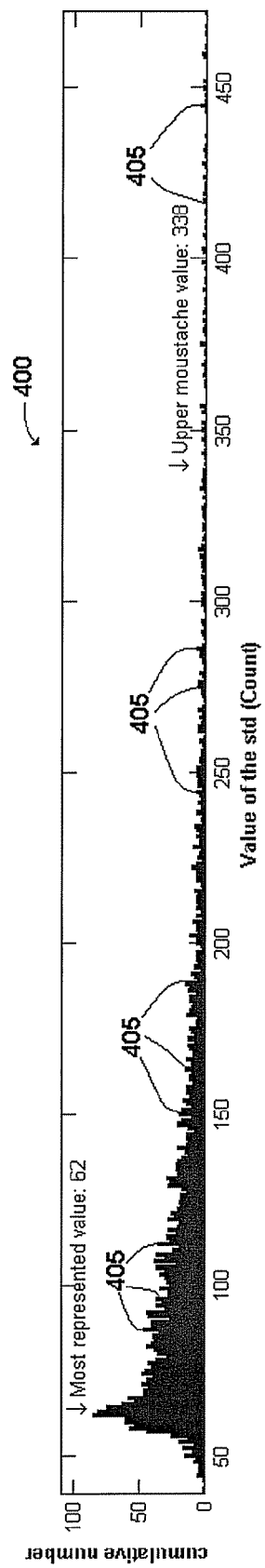
FIG. 4 depicts a histogram of the standard deviation values of FIG. 3.

Referring to FIG. 4, a histogram 400 may be computed, compiling the number of occurrences of each standard deviation value. In this example, each bar or bin 405 represents a number of subsets having a corresponding standard deviation value. As shown in FIG. 4, the greatest number of subsets in the data set have a standard deviation value of sixty-two (62 counts).

The upper moustache of the standard deviation is calculated for the entire time period studied. In the present example, shown in FIG. 4, the upper moustache of the standard deviation is three hundred and thirty eight (338 counts).

Noise data may then be filtered and seismic events may then be detected. In one embodiment, a seismic event may be considered an outlier, as its amplitude will be higher than the background noise level. The background noise level may be represented by the upper moustache of the standard deviation. Accordingly, each data subset standard deviation is compared to the upper moustache. If the standard deviation of a respective data subset is less than or equal to the upper moustache, the respective data subset is discarded.

If the standard deviation of the respective data subset is higher than the upper moustache of the standard deviation, the respective data subset is considered an outlier. The channel or sensor may be considered to have been "triggered" and thus represents a potential seismic event. The respective data subset is retained for further processing as a potential seismic event.

Each data subset in the channel is compared to the upper moustache, and is either retained or discarded based on its standard deviation value as compared to the upper moustache. In this way, data subsets representing noise may be filtered from the data set to allow for effective processing and analysis of potential seismic events.

Although the above example is described using a standard deviation value, any suitable value for the subset or individual data point may be used. Likewise, although the above example is described in the context of a single directional sensor, any number of sensors may be used. The values from multiple sensors may be combined as desired. Furthermore, any type of channel may be used, including various receivers and sensors.

In one embodiment, if a plurality of channels are provided to gather data, the geographical consistency of the data from any number of the plurality of channels may be taken into account for a given time window. For example, the location in time of one or more triggering events from a first channel is taken into account and compared to the location in time of corresponding triggering events in other channels to validate the potential seismic event detection. In another example, a potential event may be validated if the triggering event time location of the first channel and the triggering event time location of one or more other channels is within a selected time window.

In yet another example, triggering events from multiple channels in a multi-level receiver may be validated if all or at least several sensors trigger within a time window of, e.g., one second.

In one embodiment, at any stage of the method 200, seismic data may be analyzed using methods that include statistical analysis, data fitting, and data modeling. Examples of statistical analysis include calculation of a summation, an average, a variance, a standard deviation, t-distribution, a confidence interval, and others. Examples of data fitting include various regression methods, such as linear regression, least squares, segmented regression, hierarchal linear modeling, and others. Examples of data modeling include direct seismic modeling, indirect seismic modeling, and others.

The systems and associated methods described herein may be used to process data in real-time or near real-time in order to provide timely information to personnel at the site of the formation. "Real-time" data may refer to data transmitted to the collection machine upon or shortly after detection and/or recordation by one or more receivers 110. This information may then be used in order to influence interventions or to provide additional safety measures, as previously described.

In one embodiment, the method is embodied in a system comprising a dense field of receivers 110, so that a plurality of locations may be compared to detect variances. A less dense field may use the same methodology, but reliability may be reduced accordingly, as it is the variations in values calculated for the locations that provide indications of an event. Fewer data sets may provide a less reliable baseline from which to operate.

Additionally, at least one program storage device readable by a machine, tangibly embodying at least one program of instructions executable by the machine to perform the method 200 may be provided. In one embodiment, the method 200 is performed by a processor or other processing machine.

The systems and methods described herein provide various advantages over existing seismic monitoring systems. The systems and methods described herein allow for accurate identification of noise, so that data representing such noise can be removed or filtered to facilitate analysis of seismic events and potential seismic events. The systems and methods described herein also provide seismic event and noise information in a very timely manner, so that interventions may be undertaken immediately as suggested by the seismic events.

In support of the teachings herein, various analysis components may be used, including digital and/or analog systems. The devices, systems and methods described herein may be implemented in software, firmware, hardware or any combination thereof. The devices may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the devices and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure. The computer executable instructions may be included as part of a computer system or provided separately.

Further, various other components may be included and called upon for providing for aspects of the teachings herein. For example, a pump, piston, power supply (e.g., at least one of a generator, a remote supply and a battery), motive force (such as a translational force, propulsional force or a rotational force), magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for filtering noise from seismic data, the method comprising:
receiving at least one seismic data set by a processing unit;
computing a value of at least one subset of a plurality of subsets of the at least one seismic data set by the processing unit;
computing quartiles and an upper moustache (M) for the plurality of subsets by the processing unit, the upper moustache derived from the sum of a quartile and a multiple of the difference between quartiles;
comparing the upper moustache (M) to the value of the at least one subset; and
one of discarding and retaining the at least one subset as filtered seismic data, based on a result of the comparing the upper moustache (M) to the value of the at least one subset.

2. The method of claim 1, further comprising processing the seismic data set to provide data for a frequency of interest.

3. The method of claim 1, wherein the value is selected from one of an amplitude and an energy level.

4. The method of claim 1, wherein the value is selected from a statistical attribute.

5. The method of claim 4, wherein the statistical attribute is selected from one of a summation, an average, a variance, a standard deviation, a range, a t-distribution, and a confidence interval.

6. The method of claim 1, wherein the at least one subset comprises at least one data point of the data set.

7. The method of claim 1, wherein the at least one subset comprises at least one data point within a subset time period.

8. The method of claim 1, wherein discarding the at least one subset is performed responsive to the value of the at least one subset being less than or equal to the upper moustache.

9. The method of claim 1, wherein retaining the at least one subset is performed responsive to the value of the at least one subset being greater than the upper moustache.

10. The method of claim 1, wherein the plurality of subsets comprises consecutive subsets, and retaining the at least one subset comprises retaining the consecutive subsets responsive to values of the consecutive subsets being greater than the upper moustache.

11. The method of claim 1, further comprising representing the value of the subset in a diagram selected from at least one of a mathematical diagram, a histogram, a box plot, box-and-whisker plot, candlestick plot, and a probability density function plot.

12. The method of claim 1, wherein the quartiles comprise a lower quartile ($Q_1$) and an upper quartile ($Q_3$).

13. The method of claim 12, wherein the upper moustache (M) is computed from the lower quartile ($Q_1$) and the upper quartile ($Q_3$).

14. The method of claim 13, wherein the upper moustache (M) is computed using the equation:
$$M=Q_3+1.5(Q_3-Q_1).$$

15. A system for filtering noise from seismic data, the system comprising:
at least one seismic receiver for outputting seismic data; and
a processing unit for inputting the seismic data and implementing instructions for evaluating seismic data by:
receiving at least one seismic data set from the at least one seismic receiver;
computing a value of at least one subset of a plurality of subsets of the at least one seismic data set;
computing quartiles and an upper moustache (M) for the plurality of subsets, the upper moustache derived from the sum of a quartile and a multiple of the difference between quartile s;
comparing the upper moustache (M) to the value of the at least one subset; and
one of discarding and retaining the at least one subset as filtered seismic data, based on a result of the comparing the upper moustache (M) to the value of the at least one subset.

16. The system of claim 15, wherein the at least one seismic receiver is disposed in a location selected from at least one of a surface location, and a location within a wellbore.

17. The system of claim 15, wherein the at least one receiver comprises a plurality of seismic receivers.

18. The system of claim 15, wherein discarding the at least one subset is performed responsive to the value of the at least one subset being less than or equal to the upper moustache.

19. The system of claim 15, wherein retaining the at least one subset is performed responsive to the value of the at least one subset being greater than the upper moustache.

20. A computer program product for evaluating seismic data, the computer program product comprising non-transitory machine readable media storing instructions for performing a method comprising:
receiving at least one seismic data set;
computing a value of at least one subset of a plurality of subsets of the at least one seismic data set;
computing quartiles and an upper moustache (M) for the plurality of subsets, the upper moustache derived from the sum of a quartile and a multiple of the difference between quartile s;
comparing the upper moustache (M) to the value of the at least one subset; and
one of discarding and retaining the at least one subset as filtered seismic data, based on a result of the comparing the upper moustache (M) to the value of the at least one subset.

* * * * *